US010518590B2

(12) United States Patent
Stewart et al.

(10) Patent No.: US 10,518,590 B2
(45) Date of Patent: Dec. 31, 2019

(54) SYSTEM AND METHOD FOR TRACKING TIRE TREAD WEAR

(71) Applicant: Sensata Technologies, Inc., Attleboro, MA (US)

(72) Inventors: William D. Stewart, Antrim (GB); David J. Procter, Bangor (GB)

(73) Assignee: Sensata Technologies, Inc., Attleboro, MA (US)

( * ) Notice: Subject to any disclaimer, the term of this patent is extended or adjusted under 35 U.S.C. 154(b) by 164 days.

(21) Appl. No.: 15/911,582

(22) Filed: Mar. 5, 2018

(65) Prior Publication Data

US 2019/0270347 A1 Sep. 5, 2019

(51) Int. Cl.
*G01M 17/00* (2006.01)
*B60C 11/24* (2006.01)
*G01M 17/02* (2006.01)

(52) U.S. Cl.
CPC .............. *B60C 11/24* (2013.01); *G01M 17/02* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/0493; B60C 23/04; B60C 23/0498; B60C 23/0496; B60C 23/064; B60C 23/0408; B60C 23/041; B60C 23/0411; B60C 23/0488;
(Continued)

(56) References Cited

U.S. PATENT DOCUMENTS 6,327,904 B1   12/2001   Oldenettel
2013/0278771 A1*  10/2013  Magoun ................... H04N 5/33
                                              348/148

(Continued)

FOREIGN PATENT DOCUMENTS

DE   19957645 A1   5/2001
DE   10306498 A1   8/2004
(Continued)

*Primary Examiner* — Andre J Allen
(74) *Attorney, Agent, or Firm* — Burns & Levinson, LLP; Joseph M. Maraia; Daniel J. McGrath

(57) ABSTRACT

A system for tracking tread wear of a tire of a vehicle includes a processor configured to obtain a new tire rotational count value representing expected rotations of the tire over a set distance if the tire were new. A position tracking device is coupled to the vehicle and configured to track a distance traveled by the vehicle and report the distance to the processor. A wheel speed sensor is coupled to the vehicle and configured to track rotations of the tire. The processor determines a current tire rotational count value representing the number of rotations of the tire over the set distance. The processor then determines a tire tread wear value based on the new tire rotational count value and the current tire rotational count value. A display device is configured to display indicia based on the tire tread wear value.

21 Claims, 6 Drawing Sheets

(58) Field of Classification Search
CPC ..... B60C 23/20; B60C 11/243; B60C 11/246; B60C 23/06; B60C 23/0486; B60C 23/061; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 2017/0023441 A1* | 1/2017 | Luk ..................... | G01M 17/02 |
| 2017/0113495 A1* | 4/2017 | Singh .................... | B60C 11/246 |
| 2017/0368890 A1* | 12/2017 | Rodriguez Vazquez ..................... | |
| | | | B60C 11/246 |
| 2018/0003593 A1* | 1/2018 | Siegel ................... | B60C 11/246 |

FOREIGN PATENT DOCUMENTS

| | | | | |
|---|---|---|---|---|
| EP | 890458 A2 | 1/1999 | | |
| EP | 3121034 A1 * | 1/2017 | ............ | G01M 17/02 |
| GB | 2531746 A | 5/2016 | | |
| WO | WO-2014195605 A1 * | 12/2014 | | |

\* cited by examiner

SYSTEM AND METHOD FOR TRACKING TIRE TREAD WEAR

FIELD OF THE INVENTION

The subject disclosure relates to vehicle tire technology and more particularly to tracking tire tread wear.

BACKGROUND OF THE INVENTION

Many vehicles utilize tires for interaction with the ground surface. Tires often include treads on the outmost layer which are designed to effectively grip the ground surface and resist sliding. However, as the tires are used, the treads tend to wear down. Worn treads become less effective at gripping the ground surface and can result in the vehicle slipping, creating a potentially dangerous condition.

While an inspection can sometimes reveal tread wear, it is difficult to determine tread wear with a high degree of accuracy by inspecting the tire. For example, it is difficult, even from a thorough inspection, to determine how much tread depth has been lost since the tire was new and how much more tread depth could be lost before the tire becomes unsafe or illegal. Additionally, many vehicle operators do not have the expertise to conduct an adequate inspection themselves. This makes it difficult for vehicle operators to determine when and if they need to replace their tires.

SUMMARY OF THE INVENTION

In light of the needs described above, in at least one aspect, there is a need for a system and method of determining tire tread wear to a high degree of accuracy that can be easily utilized by a layperson and relied upon to inform them when they need to change the tires of their vehicle.

In at least one aspect the subject technology relates to a system for tracking tread wear of a tire of a vehicle. The system includes a processor configured to obtain a new tire rotational count value (Nn) representing expected rotations of the tire over a set distance if the tire were new. A position tracking device is coupled to the vehicle and configured to track a distance traveled by the vehicle and report the distance to the processor. A wheel speed sensor is coupled to the vehicle and configured to track rotations of the tire. The processor is further configured to: determine a current tire rotational count value (Nc) representing the number of rotations of the tire over the set distance based on data received from the position tracking device and the wheel speed sensor; and determine a tire tread wear value based on the new tire rotational count value and the current tire rotational count value. A display device is configured to display indicia based on the tire tread wear value.

In some embodiments, the processor is further configured to obtain a worn tire rotational count value (Nw) representing the expected rotations of the tire over the set distance if the tire was worn to a desired replacement condition. The desired replacement condition can be based on a minimum legal tire tread depth. In some cases, the processor can then determine the tire tread wear value as a percentage of total wear between a new tire of the same type and a tire of the same type worn to the desired replacement condition. In some embodiments, the processor determines the tire tread wear value by interpolating Nc between Nn and Nw. The processor can be further configured to adjust Nc based on compensation variables before determining the tire tread wear value.

In some embodiments, the compensation variables account for at least the following: angular speed of the tire; linear velocity of the vehicle; steering wheel angle; road surface; tire slip; tire pressure; tire temperature; and vehicle mass. In some embodiments, a plurality of sensors are configured to measure values of compensation variables and report to the processor. The sensors can include: a steering wheel angle sensor; a tire pressure monitoring sensor; a vehicle mass sensor; and the wheel speed sensor.

In some embodiments, the processor is further configured to adjust Nc based on at least some of the compensation variables by determining an effective rolling radius of the tire and adjusting Nc based on the effective rolling radius. Further, the processor can be configured to adjust Nn prior to determining the tire tread wear value by determining an effective rolling radius of a new tire and adjusting Nn based on the effective rolling radius.

In at least one aspect, the subject technology relates to a method for tracking tire tread wear of a tire of a vehicle. The method includes determining a new tire rotational count value (Nn) representing expected rotations of the tire over a set distance if the tire were new. Movement of the vehicle is tracked using a position tracking device. Rotations of the tire are tracked using a wheel speed sensor. A current tire rotational count value (Nc) is determined representing the number of rotations of the tire over the set distance based on data received from the position tracking device and the wheel speed sensor. A tire tread wear value is determined based on the new tire rotational count value and current tire rotational count value. Indicia is displayed based on the tire tread wear value.

In some embodiments, a worn tire rotational count value (Nw) is determined representing the expected rotations of the tire over the set distance if the tire was worn to a desired replacement condition. The desired replacement condition can be based on a minimum legal tire tread depth. In some embodiments, the tire tread wear value is further determined based on Nw, the tire tread wear value being determined by one of the following equations: $((Nc-Nn)/(Nw-Nn))*100\%$; $((Nw-Nc)/(Nw-Nn))*100\%$. In some embodiments, prior to the step of determining the tire tread wear value, adjusting Nc based on compensation variables.

In some embodiments, the method further includes obtaining data for use in determining compensation variables using at least one sensor. The method can also include checking the data received from the at least one sensor against data received by at least one other sensor within the vehicle. The compensation variables can account for at least the following: angular speed of the tire; linear velocity of the vehicle; steering wheel angle; road surface; tire slip; tire pressure; tire temperature; and vehicle mass. In some embodiments, the compensation variables include a combination of internal characteristics of the tire and external characteristics of an environment in which the vehicle is operated. Further, in the step of adjusting Nc based on compensation variables, the compensation variables can be relied upon to determine an effective rolling radius of the tire and Nc is adjusted based on the effective rolling radius. In some embodiments, prior to determining the tire tread wear value, an effective rolling radius of a new tire is calculated and Nn is adjusted based on the effective rolling radius.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
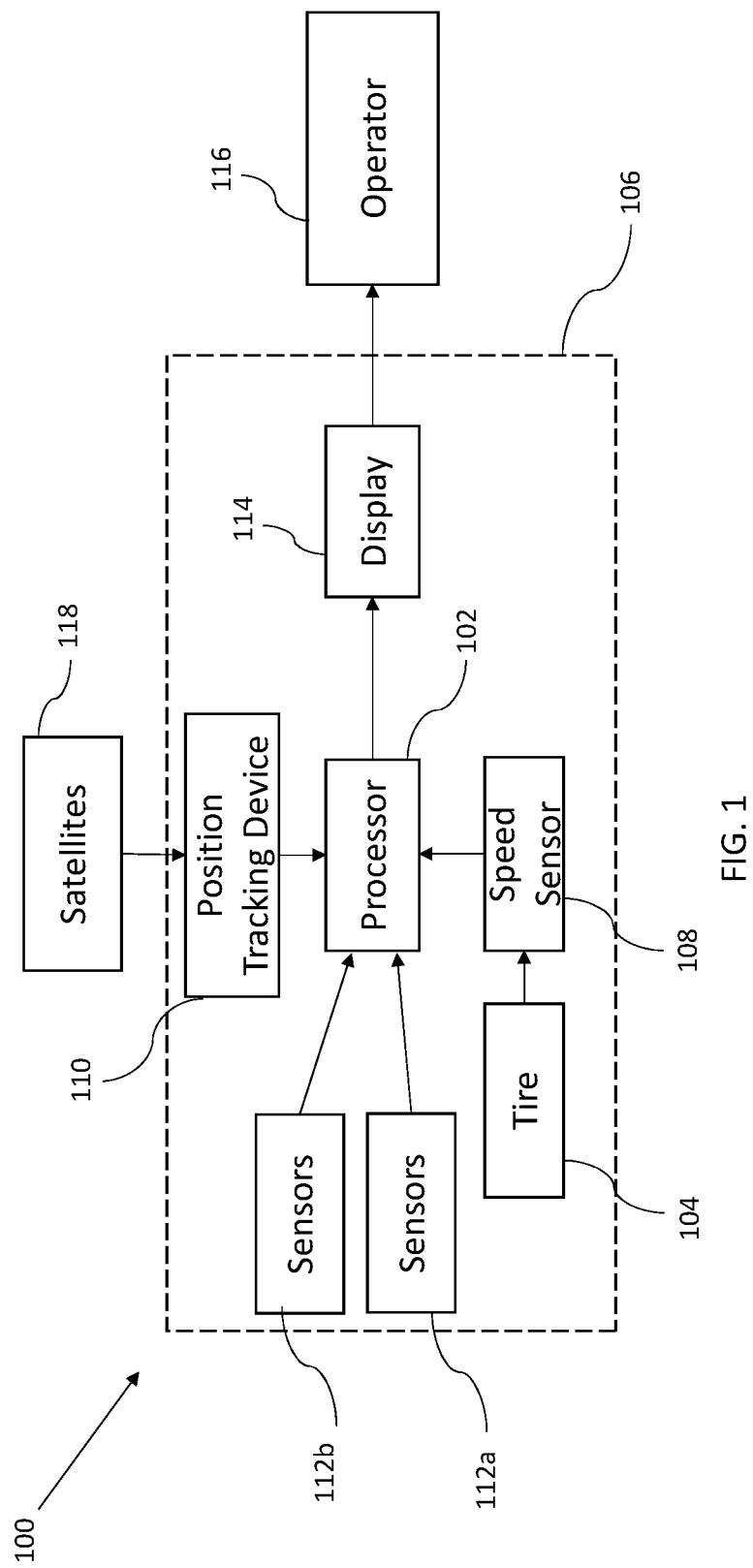
FIG. 1 is a schematic block diagram of a system in accordance with the subject technology.

The subject technology overcomes many of the prior art problems associated with pressure sensors. In brief summary, the subject technology provides a system and method for easily tracking wear on the treads of tires through indirect data. The tread wear, or indicia based on tread wear, is displayed for a vehicle operator, improving safety by allowing the operator to anticipate when a tire replacement will be needed. Other advantages and features of the systems and methods disclosed herein will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top). Additionally, when a number of similar components are identified with like reference numerals (e.g. two sets of sensors are given reference numerals 112a and 112b) the components are sometimes referred to collectively with a single reference numeral (e.g. just 112).

Referring now to FIG. 1, a block diagram of a system in accordance with the subject technology is shown generally at 100. In general, the system 100 includes a processor 102 which determines the number of rotations of a tire 104 over a set distance traveled by a vehicle 106. Notably, except where otherwise noted, the term "tire" is used herein to describe all components of a vehicular wheel including the rim and outer tire/tread portion. The processor 102 receives information on tire rotations from a speed sensor 108 and relies on data from a position tracking device 110 to determine when the set distance has been traveled. The number of tire rotations over the set distance can then be optionally adjusted based on information received by the processor 102 from other sensors 112a, 112b (generally 112) to account for internal or external factors that affect the number of tire rotations which were needed to travel the set distance. The number of tire rotations can further be adjusted, or double checked, through information received from other sensors (not distinctly shown) which are incorporated in the vehicle for various other purposes. The identified number of tire rotations can then be relied upon to determine a tire tread wear value. A display 114 mounted within the vehicle 106 can then display indicia of the tire tread wear value for an operator 116. The indicia can include any indication of tire wear based on the tire tread wear value such as the actual tire tread wear value (as a length measurement or percentage), a diagnostic trouble code, or an indicator light, for example. Notably, in some cases, data from multiple sensors 112 within the vehicle can be combined to achieve sensor fusion, improving accuracy and ensuring robustness of the system 100.

Still referring to FIG. 1, many of the components for operating the system 100 can be included within, or as a part of the vehicle 106 itself, such as the processor 102, the tire 104, the speed sensor 108, the position tracking device 110, the sensors 112, and the display 114. Other external components, such as satellites 118 which interface with the position tracking device 110, can also be relied upon by the system 100 to receive additional data as needed.

The system 100 can be turned on as required, or can operate continuously. When the system 100 is on, the position tracking device 110 obtains and reports data on vehicle position to the processor 102. The position tracking device 110, which is itself coupled to the vehicle 106, can obtain the position of the vehicle 106, for example, by interfacing with satellites 118 from a global navigation satellite system such as GPS or Galileo. The data from the position tracking device 110 is ultimately used to determine when the vehicle 106 has traveled a set distance. Therefore the position tracking device 110 can either report raw vehicle position data to the processor 102 which can then determine the distance traveled over that interval, or the position tracking device 110 can convert the position data into a distance traveled, reporting the distance to the processor 102 (e.g. reporting to the vehicle 106 at frequent intervals).

A set distance is predetermined by the system and used as a reference basis. As the vehicle travels a measuring period will occur. The measuring period involves tracking the rotations of at least one tire 104 as the vehicle 106 travels to eventually determine a tire tread wear value, as discussed in more detail below. The set distance can be any of a range of distances depending on the application of the subject technology. Using a short set distance (e.g. less than 1 km) will allow for quick reporting but runs a risk of inaccuracies due to a small sample size. Generally, using a larger set distance (e.g. 1-10 km) will result in a more accurate tire tread wear value, although the process will take longer to complete, as the vehicle needs to travel the entire set distance. In general, accuracy tends to improve as larger set distances are used. The actual set distance used by the system varies based on factors including speed, acceleration, and the like.

During the measuring period, the speed sensor 108 tracks the number of rotations of the tire 104. The speed sensor 108 can function in accordance with other speed sensors which track tire rotation as are known in the art such as the type frequently incorporated into antilock braking systems. For example, the speed sensor 108 can be seated on a non-rotating portion of the vehicle 106 adjacent to the tire 104 (or a rim of the tire 104) and contain a number of teeth, each of which is triggered as a corresponding reference on the tire 104 or axel rotates past that particular tooth. Rotations of the tire 104 can be tracked based on how times the reference passes the teeth, either by the speed sensor 108 itself or by the processor 102 after receiving a signal from the speed sensor 108. The resolution of the rotational count is determined by the number of teeth included in the speed sensor 108. Notably this is only one way in which the speed sensor 108 can function to determine vehicle speed and other types of speed sensors as are known in the art can also be used.

The processor 102 can be in communication with a controller area network (CAN) bus for the vehicle 106 which provides access to memory including stored data. To that end, the stored data can include a new tire rotational count value (Nn) representing expected rotations of the tire over a set distance if the tire were new. The stored data can also include a worn tire rotational count value (Nw) representing the expected rotations of the tire over the set distance if the tire was worn to a desired replacement condition ("worn tire" here thus being distinguishable from the current tire in use which is also worn). As will be described in more detail below, a comparison of current tire rotational count (Nc) and Nn and/or Nw can yield the tire tread wear value. Indicia of the tire tread wear value can then be shown to the operator 116 via the display 114. Notably, there can also be a delay in presenting results to the user if desired. For example, if the tire tread wear value crosses a minimum threshold, additional and repetitive measurements can be made to ensure accuracy before presenting an error light to the user as an indicia of the worn tire. In some cases, and as described above, the indicia may simply be the actual tire tread wear value.

Figures 2A, 2B:
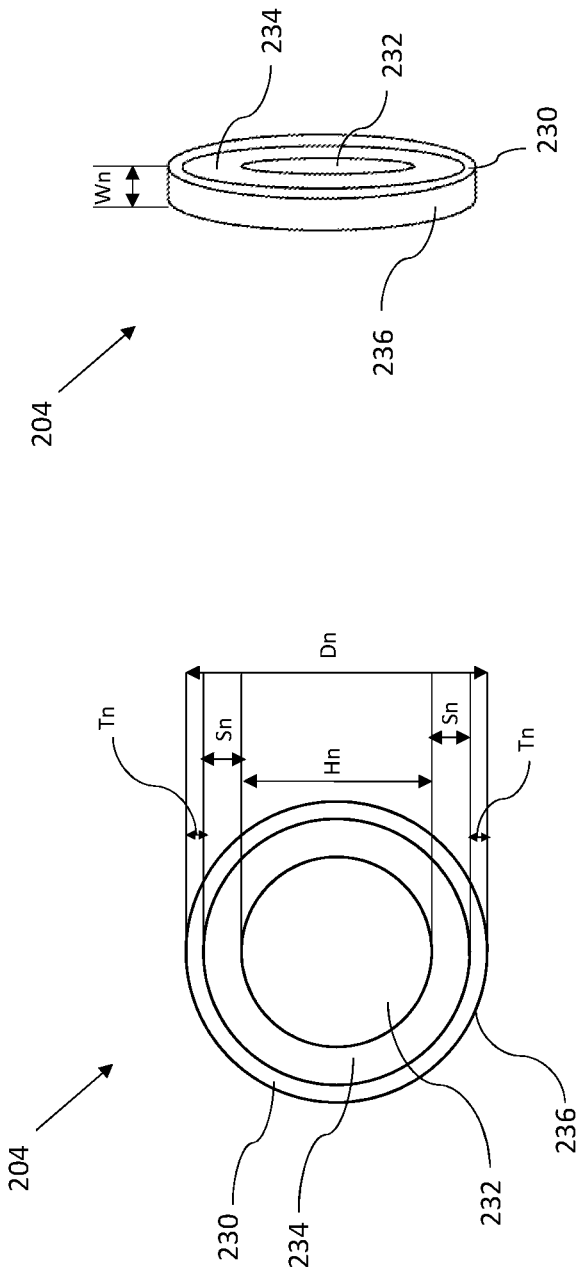
FIG. 2A is a side view of a new tire for a vehicle.
FIG. 2B is a perspective view of a tire of FIG. 2A.
Figure 3B:
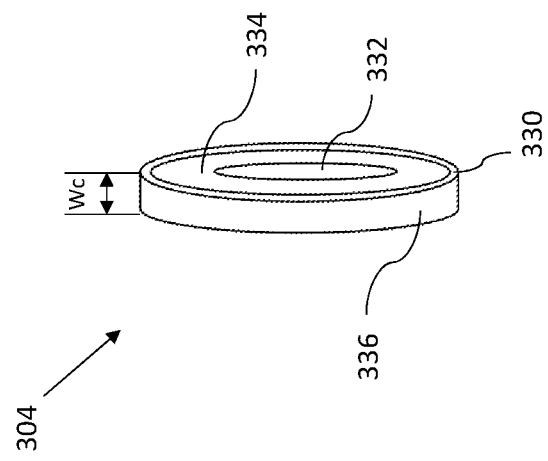
FIG. 3B is a perspective view of the tire of FIG. 3A.
Figure 3A:
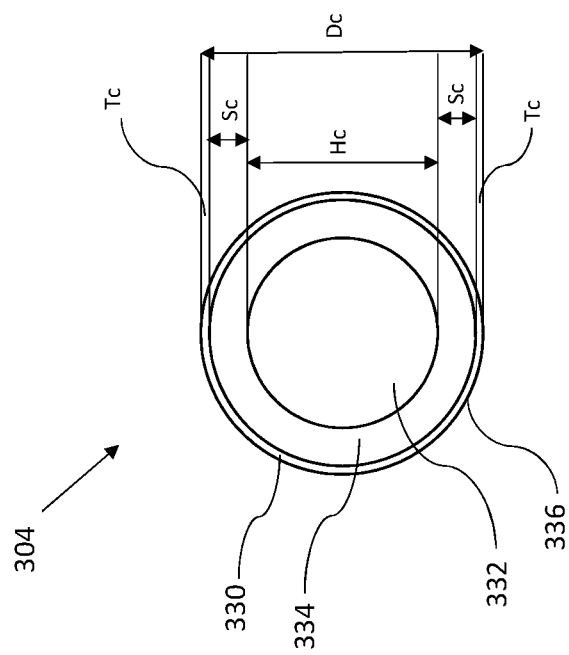
FIG. 3A is a side view of a used tire for a vehicle.

Referring now to FIGS. 2A-3B, schematic drawings of exemplary tires are shown. In particular, FIGS. 2A and 2B show a new tire 204 which has a new, unworn tread 230, while FIGS. 3A and 3B show a currently in use tire 304 with a tread 330 that has worn over the course of the vehicle being used. The tires 204, 304 are designed similarly to conventional tires and are generally similarly to one another, aside from the degree of wear on the treads 230, 330. Therefore the new tire 204 is described below for the sake of simplicity, with it being understood that the current tire 304 includes similar parts denoted by like reference numerals.

The tire 204 has a width Wn and diameter Dn. A tire casing surrounds the rim 232. The casing includes a section 234 of height Sn between the rim 232 and the treads 230 along the outer most portion of the tire 204. The treads 230 are designed with an outermost surface 236 meant to grip a ground surface. To that end, the tread outer surface 236 can be formed from the outermost portion of various gripping parts from the treads 230 such as ribs, grooves, protrusions, or the like. As the tire 204 becomes worn, the height or depth of the treads is reduced (e.g. new treads 230 have a greater depth than used treads 330).

The total diameter Dn is formed by a combination of the inner rim 232 having height Hn, the casing section 234 having height Sn, and treads 230 having a height or depth of Tn. Therefore the total diameter is given by the equation Dn=Hn+2Sn+2Tn. Notably, the circumference of the tire 204 is a factor of the total diameter Dn of the tire 204, which is in turn a factor of the tread depth Tn. Similarly, the number of tire rotations needed to travel a set distance is a factor of the circumference of the tire 204. In this way, when the system 100 tracks tire rotations over a set distance for a used tire, such as current tire 304, the change in tire tread depth can be determined by comparing the current tire rotational count value (Nc) to the expected rotations over that same distance required for a new tire (new tire rotational count value Nn). In some cases, it is assumed that the other factors which make up the tire diameter Dn tend to remain constant between the new tire 204 and current tire 304 (i.e. Hn=Hc and Sn=Sc) and no other factors affect Nc. However in some embodiments, as will be discussed in more detail below, other compensation variables are measured and/or utilized to determine a more accurate tire tread wear value.

Figure 4:
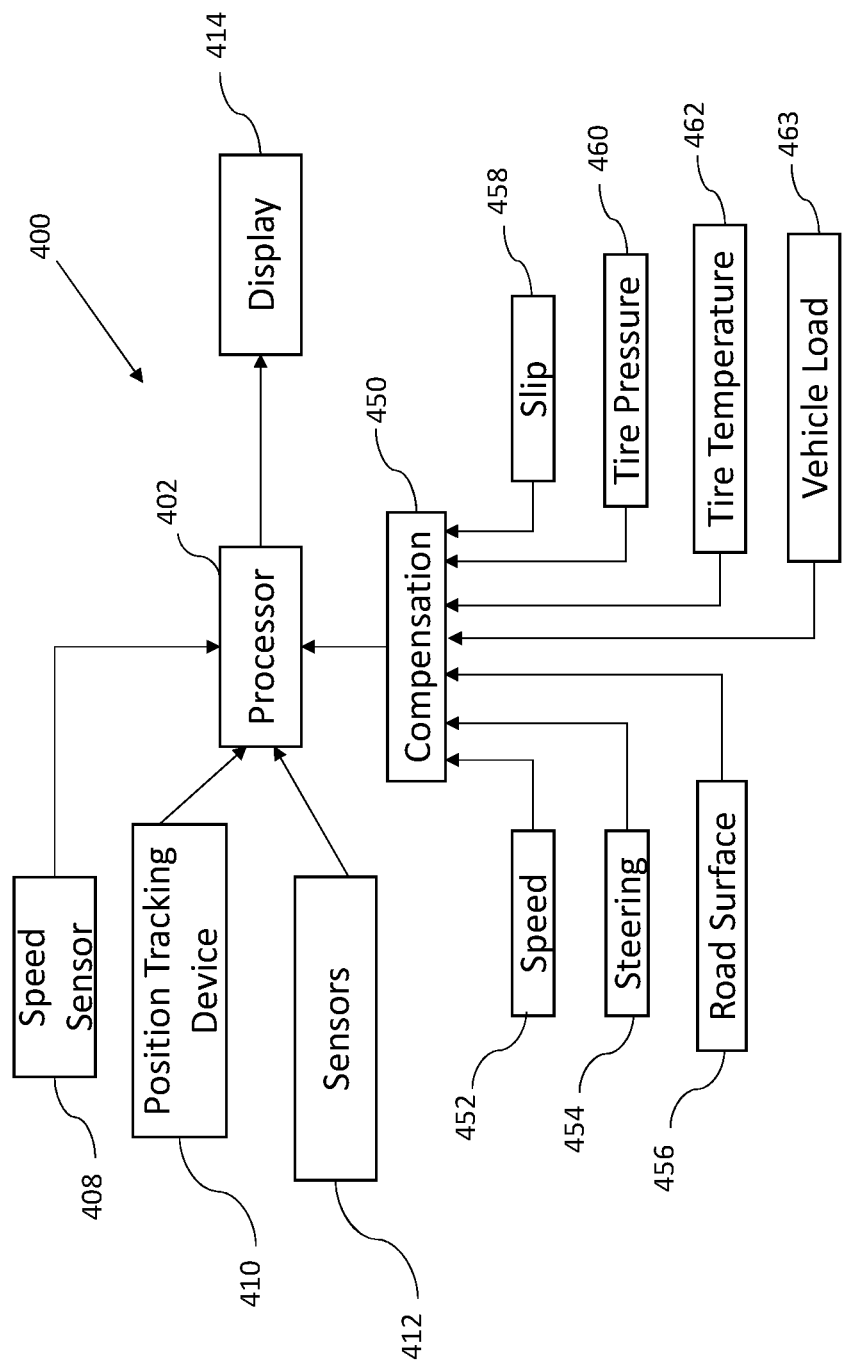
FIG. 4 is a block diagram of the flow of information within a system in accordance with the subject technology.

Referring now to FIG. 4, a block diagram of the flow of information within a system 400 in accordance with the subject technology is shown. As discussed above, the speed sensor 408 provides information on tire rotations to the processor 402 and the position tracking device 410 provides position data to the processor 402 which can be relied upon to determine when the vehicle has traveled the set distance. Sensors 412 can provide various other information to assist in tracking various data, as discussed more below.

Compensation variables 450 can be relied upon to further improve accuracy of the system 400 when available. Compensation variables 450 account for differences between the new tire rotational count value (Nn) and current tire rotational count value (Nc) that are due to factors other than tread wear. These compensation variables 450 can be measured by internal sensors or external sensors, or simply calculated by the processor 402 based on other known or calculated data. Further, the compensation variables 450 can be internal factors within the tire system, or external factors from the environment affecting the vehicle, as discussed in more detail herein. While speed sensor 408, position tracking device 410, and sensors 412 are all shown as reporting to the processor 402 for simplicity, it should be recognized that all sensors shown can also be relied upon to determine compensation variables 450.

While the list of compensation variables 450 shown is by no means all inclusive, speed 452, steering 454 (or steering wheel angle), road surface 456, tire slip 458, tire pressure 460, tire temperature 462, and vehicle load 463 are all important factors which can be included in compensation variables 450 used by the processor 402 to adjust the current tire rotational count value to find a tire wear value. For example, a tire or valve mounted tire pressure monitoring sensor can determine road surface type 456, tire pressure 460, and tire temperature 462. Various road surface types 456 can potentially cause slipping, resulting in tire rotation counts that don't reflect the true number of tire rotations that were required to travel the set distance. Tire pressure 460 has a direct impact on the diameter of the tire and therefore the current tire rotational count value used to determine tread wear. Likewise, tire temperature 462 can result in expansion or contraction of the tire, thereby changing diameter. Thus road surface type 456, tire pressure 460, and tire temperature 462 can be tracked and accounted for by adjusting the current tire rotational count value, or other variables, accordingly.

Speed 452 and tire slip 458 can be tracked using a speed sensor configured to track tire rotations, such as the speed sensor 108 discussed above. Tire slip 458 affects the current tire rotational count similarly as road surface type 456. That is, tire slip 458 can cause an inaccurate rotational count as tire rotations are counted even though the counted rotations are not causing the vehicle to travel any corresponding distance. Vehicle speed also impacts the tire tread wear value calculations as centrifugal force can cause a change in tire diameter. The speed compensation 452 can include adjustments for angular speed of the tire and for the overall linear velocity of the vehicle. Therefore speed 452 and road surface type 456 variables can be measured and appropriate adjustments made to the current tire rotational count, tire tread wear value, and/or other variables as needed.

In another example, a steering wheel angle sensor can also provide information to the processor 402 on the extent to which the steering wheel turned, which reflects vehicle turning or steering 454. When a vehicle turns, the outside of the tire travels further than the inner side of the tire. A tire mounted sensor can also determine the mass of the vehicle, the mass of the vehicle potentially changing the diameter of the tires, and a corresponding vehicle load 463 variable can be incorporated as part of the compensation variables 450. Therefore appropriate corrections can be made when the compensation variables 450 are applied. All corrections can be made within the processor 402 based on input received with respect to the aforementioned compensation variables 450 (e.g. from the data received from corresponding sensors or alternatively derived).

In some embodiments, the correction variables 450 can be applied through the processor 402 by determining an effective rolling radius of the tire. Like some of the compensation variables 450 described above, the effective rolling radius of the tire accounts for factors unrelated to tread depth which affect the number of tire rotations needed for the vehicle to travel a given distance. Therefore factors affecting the effective rolling radius can similarly be included as compensation variables and/or used to adjust the current tire rotational count value. Effective rolling radius can be affected by vehicle mass, tire stiffness, and a speed constant, for example. As an alternative, instead of applying all or some of the compensation variables 450 to modify the current tire rotational count value, an expected rolling radius can be used to modify the new tire rotational count value to account for anticipated real world conditions (i.e. rather than just relying on the circumference). In such a case, compensation variables 450 already applied in calculating the effective rolling radius of the new tire need not be additionally applied when calculating current tire rotational count value.

Additionally, data from multiple sensors 412 within the vehicle can be combined to achieve sensor fusion. The sensors 412 used in this way can be any of the sensors 412 described herein, such as sensors 412 tracking accelerometric measurements, tire pressure, temperature, or any other sensor within the vehicle. Combining the data received from multiple sensors 412 improves accuracy and helps ensure robustness of the system 400.

Figure 5:
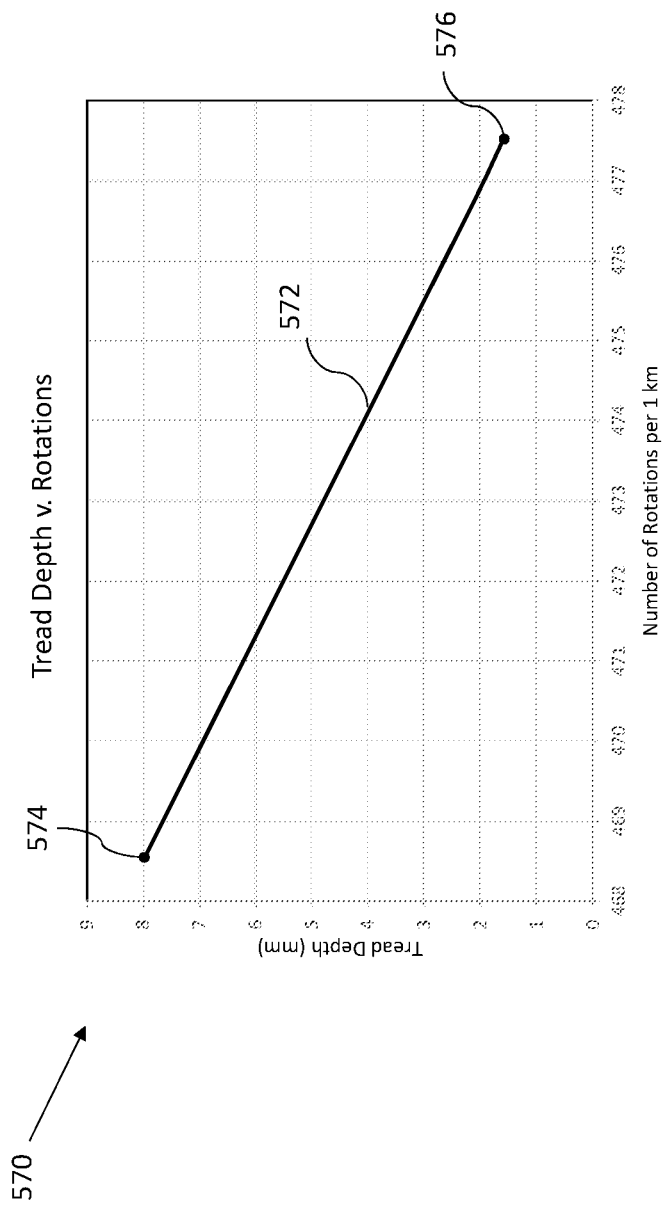
FIG. 5 is a sample graph of the relationship between tread depth and tire rotations illustrating an application of the subject technology.

Referring now to FIG. 5, a sample graph of the relationship between tread depth and tire rotations is shown at 570. The graph 570 has an x-axis that shows number of tire rotations over a set distance of 1 km, while the y-axis shows the tire tread depth in millimeters. The graph line 572 shows tread depth a given number of tire rotations over 1 km corresponds to. To that end, the graph line 572 starts at an upper tread depth 574 of 8 mm, which represents the depth of a brand new tire of the type used in this example, and finishes at a lower tread depth 576 of 1.6 mm. The lower tread depth 576 represents the tread depth when the tire has worn until reaching a desired replacement condition. In this case, the desired replacement condition of a tread depth of 1.6 mm is based on a minimum legal tire tread depth used in the European Union and in some states within the United States of America. However, the desired replacement condition can be set to other values as desired by the user of the system or operator of the vehicle. For example, the desired replacement condition can be set to a tread depth of 3.0 mm in accordance with some manufacturer recommendations.

The number of rotations per 1 km for the tire of the example graph is calculated using a number of equations. For a new tire, the diameter is given as: $Dn=Wn (AR/100)*2+Hn*25.4$. In this equation, AR is an aspect ratio which can be programmed into a tire mounted sensor at the time of installation and transmitted to the process, or alternatively, can be transmitted to the processor through the CAN bus from another input source. This allows a height between the tire rim and outer surface to be calculated based the tire width (i.e. calculating Sn+Tn from FIG. 2A). Hn represents the rim size and is multiplied by 25.4 to convert the rim size Hn from inches to millimeters. After obtaining diameter, the circumference can then be calculated, which can in turn be used to determine rotations required for a set distance. Therefore, for a set distance of 1 km, the following calculations were done to yield a new tire rotational count value (Nn) of 468.5:

$$Dn=(225*(55/100)*2+17*25.4)=679.3 \text{ mm}$$

$$Cn=\pi*679.3=2134.1 \text{ mm}$$

$$Nn=1{,}000{,}000/2143.1=468.5 \text{ rotations}$$

Similar calculations can be done to obtain the worn tire rotational count value (Nw) after a desired tread depth is determined. Nw can then be stored within memory accessible by the processor 102.

The graph 570 suggests several possible options for how the final tire tread wear value can be determined from the analysis of the gathered data, indicia of the tire tread wear value ultimately presented to the user via a display (as the actual tire tread wear value or as other indicia of worn tires/tire wear). For example, the processor 102 can use the current tire rotational count value (Nc) to determine the tire tread wear value as a percentage of total wear between a new tire of the same type (e.g. 8 mm tread depth) and a tire of the same type worn to the desired replacement condition (e.g. 1.6 mm tread depth). This can be done through interpolation. Visually, interpolation can be done by identifying the location of Nc on the graph line 570, but in practice the processor 102 will calculate this value. Thus, if it is desired display a tire tread wear value as a percentage of total wear with a new tire with a tread depth of 8 mm representing zero wear and a tread depth of 1.6 representing a completely worn tire with 100 percent wear, the following equation can be used: $((Nc-Nn)/(Nw-Nn))*100\%$. Likewise, if it is instead desired to give the tire tread wear value as a percentage of tread remaining, the opposite interpolation equation can be used: $((Nw-Nc)/(Nw-Nn))*100\%$. Notably, these are only some examples of how total tread wear can be determined. In other cases, the worn tire rotational count can be omitted entirely and the total tread wear value can be determined only by comparing Nc to Nn. In particular, Nn can be subtracted from Nc after adjusting for compensation variables as discussed above. The difference between Nc and Nn, known as the rotational count delta, can be then be used to determine a difference in diameter and thus, a difference in tread depth. The difference in tread depth can then be reported to the operator as the tire tread wear value as a change in tread depth (e.g. in mm), remaining tread depth, percentage of tread depth wear, or otherwise as preferred.

Figure 6:
FIG. 6 is a flowchart of a method of tracking tire tread wear in accordance with the subject technology.

Referring now to FIG. 6, a flowchart of a method of tracking tire tread wear in accordance with the subject technology is shown generally at 680. The method 680 is carried out in accordance with the systems 100, 400 and components thereof and using the other processes discussed herein. The method starts, at step 682, with determining a new tire rotational count value (Nn) which represents the expected rotations of the tire over a set distance if the tire were new, the set distance being a predetermined static value. In particular, Nn is calculated for a new tire of the same type as the current tire on which tread wear is being tracked. Nn can be a simple calculation of the number of tire rotations required to travel the set distance based on the circumference of the new tire. Alternatively, Nn can be a more complex calculation, adjusted by factors that are internal and external to the vehicle to more accurately reflect the value of Nn in real world conditions. For example, Nn can be adjusted based on expected compensation variables and/or an expected effective rolling radius, as discussed above.

At step 684, vehicle movement is tracked with a position tracking device such as a global position satellite system device. Meanwhile, at step 686, tire rotations are tracked using a wheel speed sensor. At step 688, the vehicle position data and tire rotation data is relied upon to determine a current tire rotational count value (Nc) representing the number of rotations of the current tire over the set distance. In particular, the period during which the set distance has been traveled can be determined based on data from the position tracking device, and therefore Nc can be determined by reviewing tire rotations from the wheel speed sensor over that time period. Nc can also be optionally adjusted based on real world internal and external conditions which change the number of rotations needed to travel the set distance, as discussed above. Notably, not all factors need to be considered if corresponding adjustments have already been made to Nn.

At step 690, a tread wear value is determined based on a comparison of Nn and Nc. In particular, as the tire treads wear down, more rotations of the tire are required to travel the same distance. Once other factors that may affect the number of rotations have been accounted for, the remaining difference in rotations (i.e. Nc-Nn) can be used to calculate a change in diameter, and therefore a change in tread depth and/or tire tread wear value. The tire tread wear value, or indicia thereof, can then be displayed to the operator at step 692 to inform the operator when and if they need to replace their tires. This improves safety of the vehicle by allowing the operator to anticipate when a tire replacement will be needed and help prevent the use of dangerously worn tires on the roads.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., processors, sensors, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A system for tracking tread wear of a tire of a vehicle comprising:
   a processor configured to obtain a new tire rotational count value (Nn) representing expected rotations of the tire over a set distance if the tire were new;
   a position tracking device coupled to the vehicle and configured to track a distance traveled by the vehicle and report the distance to the processor;
   a wheel speed sensor coupled to the vehicle and configured to track rotations of the tire, wherein the processor is configured to: determine a current tire rotational count value (Nc) representing the number of rotations of the tire over the set distance based on data received from the position tracking device and the wheel speed sensor; and determine a tire tread wear value based on the new tire rotational count value and the current tire rotational count value; and
   a display device configured to display indicia based on the tire tread wear value.

2. The system of claim 1, wherein the processor is further configured to obtain a worn tire rotational count value (Nw) representing the expected rotations of the tire over the set distance if the tire was worn to a desired replacement condition.

3. The system of claim 2 wherein the desired replacement condition is based on a minimum legal tire tread depth.

4. The system of claim 2 wherein the processor determines the tire tread wear value as a percentage of total wear between a new tire of the same type and a tire of the same type worn to the desired replacement condition.

5. The system of claim 2 wherein the processor determines the tire tread wear value by interpolating Nc between Nn and Nw.

6. The system of claim 1 wherein the processor is further configured to adjust Nc based on compensation variables before determining the tire tread wear value.

7. The system of claim 6 wherein the compensation variables account for at least the following: angular speed of the tire; linear velocity of the vehicle; steering wheel angle; road surface; tire slip; tire pressure; tire temperature; and vehicle mass.

8. The system of claim 6 further comprising a plurality of sensors configured to measure values of the compensation variables and report to the processor.

9. The system of claim 8 wherein the plurality of sensors include: a steering wheel angle sensor; a tire pressure monitoring sensor; a vehicle mass sensor; and the wheel speed sensor.

10. The system of claim 9 wherein the processor is configured to adjust Nc based on at least some of the compensation variables by determining an effective rolling radius of the tire and adjusting Nc based on the effective rolling radius.

11. The system of claim 1 wherein the processor is configured to adjust Nn prior to determining the tire tread wear value by determining an effective rolling radius of a new tire and adjusting Nn based on the effective rolling radius.

12. A method for tracking tire tread wear of a tire of a vehicle comprising:
    determining a new tire rotational count value (Nn) representing expected rotations of the tire over a set distance if the tire were new;
    tracking movement of the vehicle using a position tracking device;
    tracking rotations of the tire using a wheel speed sensor;
    determining a current tire rotational count value (Nc) representing the number of rotations of the tire over the set distance based on data received from the position tracking device and the wheel speed sensor;
    determining a tire tread wear value based on the new tire rotational count value and current tire rotational count value; and
    displaying indicia based on the tire tread wear value.

13. The method of claim 12 further comprising determining a worn tire rotational count value (Nw) representing the expected rotations of the tire over the set distance if the tire was worn to a desired replacement condition.

14. The method of claim 13 wherein the desired replacement condition is based on a minimum legal tire tread depth.

15. The method of claim 13 wherein the tire tread wear value is further determined based on Nw, the tire tread wear value being determined by one of the following equations:

$$((Nc-Nn)/(Nw-Nn))*100\%; ((Nw-Nc)/(Nw-Nn))*100\%.$$

16. The method of claim 12 further comprising, prior to the step of determining the tire tread wear value, adjusting Nc based on compensation variables.

17. The method of claim 16 further comprising obtaining data for use in determining compensation variables using at least one sensor,
   wherein the compensation variables account for at least the following: angular speed of the tire; linear velocity of the vehicle; steering wheel angle; road surface; tire slip; tire pressure; tire temperature; and vehicle mass.

18. The method of claim 16 wherein the compensation variables include a combination of internal characteristics of the tire and external characteristics of an environment in which the vehicle is operated.

19. The method of claim 16 wherein, in the step of adjusting Nc based on compensation variables, the compensation variables are relied upon to determine an effective rolling radius of the tire and Nc is adjusted based on the effective rolling radius.

20. The method of claim 12 wherein, prior to determining the tire tread wear value, an effective rolling radius of a new tire is calculated and Nn is adjusted based on the effective rolling radius.

21. The method of claim 12 wherein, the tire tread wear value is further based on a plurality of sensors tracking compensation variables.

\* \* \* \* \*